United States Patent
Werner

(10) Patent No.: US 8,089,504 B2
(45) Date of Patent: *Jan. 3, 2012

(54) TERMINAL WITH PROJECTED DISPLAY

(75) Inventor: Marco Werner, Munich (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

This patent is subject to a terminal disclaimer.

(21) Appl. No.: 12/135,844

(22) Filed: Jun. 9, 2008

(65) Prior Publication Data

US 2009/0009666 A1    Jan. 8, 2009

Related U.S. Application Data

(63) Continuation of application No. 10/381,776, filed on Sep. 15, 2003, now Pat. No. 7,385,620, which is a continuation of application No. PCT/DE00/03415, filed on Sep. 28, 2000.

(51) Int. Cl.
*H04N 7/14* (2006.01)

(52) U.S. Cl. .................. 348/14.02; 348/14.07; 353/122; 455/556.1

(58) Field of Classification Search .... 348/14.01–14.16, 348/208.1, 208.11; 345/156, 158, 672; 359/554, 359/557, 683, 691, 813
See application file for complete search history.

(56) References Cited

U.S. PATENT DOCUMENTS

| | | | |
|---|---|---|---|
| 3,531,176 A | | 9/1970 | Humphrey |
| 3,577,205 A | | 5/1971 | Hobrough |
| 3,910,693 A | | 10/1975 | De La Cierva |
| 4,290,684 A | | 9/1981 | Hines |
| 5,280,387 A | | 1/1994 | Maruyama |
| 5,606,456 A | * | 2/1997 | Nagata et al. ............... 359/554 |
| 5,949,087 A | | 9/1999 | Cooper |
| 5,978,601 A | | 11/1999 | Masumoto et al. |
| 6,317,114 B1 | * | 11/2001 | Abali et al. .................. 345/672 |
| 6,331,848 B1 | * | 12/2001 | Stove et al. ................. 345/156 |
| 6,371,616 B1 | | 4/2002 | Doany et al. |
| 6,694,096 B1 | | 2/2004 | Imada |

FOREIGN PATENT DOCUMENTS

| | | |
|---|---|---|
| EP | 0 004 813 | 10/1979 |
| EP | 0 909 087 | 4/1999 |
| JP | 409327007 | 12/1997 |
| JP | 2000050360 | 2/2000 |
| JP | 2000221954 | 8/2000 |

* cited by examiner

*Primary Examiner* — Melur Ramakrishnaiah

(57) ABSTRACT

A mobile data and/or communication terminal is provided which includes an optical system for the generation of a projected display as well as parts for stabilizing the display when the terminal is moved.

24 Claims, 1 Drawing Sheet

TERMINAL WITH PROJECTED DISPLAY

CROSS-REFERENCE TO RELATED APPLICATIONS

This application is a continuation of U.S. application Ser. No. 10/381,776 filed Sep. 15, 2003 entitled "TERMINAL WITH PROJECTED DISPLAY", issued as U.S. Pat. No. 7,385,620, which is a continuation of the U.S. national stage designation of International application PCT/DE00/03415 filed Sep. 28, 2000, the entire content of which is expressly incorporated herein by reference thereto.

BACKGROUND

The present invention relates to a mobile data or communication terminal. Such a terminal is, for example, a mobile video telephone or a mobile video camera for still or moving images. The terminal also can be a mobile small computer.

Various methods are currently used in video cameras for stabilizing images. FIG. 1 shows one such method, in which movable lenses are used. In this method, an object OB is recorded by a recording device AE; for example, a video camera. The recording device AE has an image sensor BS; for example, a CMOS chip. The recording device AE has an optical system or a lens system OT via which the object OB is mapped to the image sensor BS.

Upon movement of the recording device AE, different image segments BA are produced, as shown by the solid and the broken lines. The recording device AE has motion sensors, which are not shown in detail, which record this movement and move the optical system OT so as to stabilize the image. Stabilization of the image ultimately prevents blurred images from being recorded via the image sensor BS.

The mobile terminals mentioned in the introduction generally have display devices, such as LC displays, for reproducing images and/or status information and input instructions.

An object of the present invention is, therefore, to improve the operation of mobile terminals with projected displays.

SUMMARY

The mobile terminal according to the invention has a stabilized projected display. In cases where the terminal is operated via an integrated keyboard, it is thus possible to prevent movement of the projected display when the keys are pressed.

Additional features and advantages of the present invention are described in, and will be apparent from, the following Detailed Description of the Invention and the Figures.

DETAILED DESCRIPTION

Figure 1:
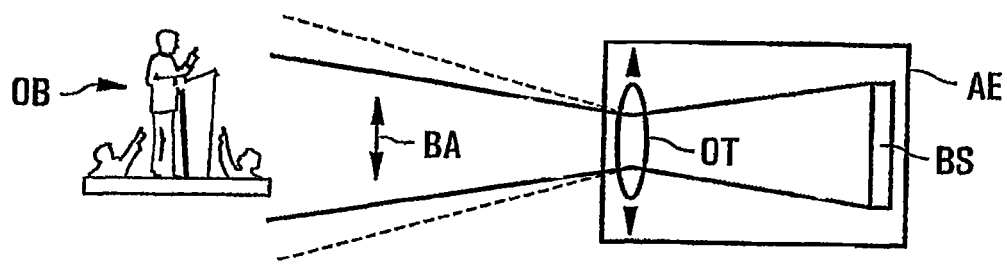
FIG. 1 shows image stabilization at the recording end in a video camera according to the prior art.
Figure 2:
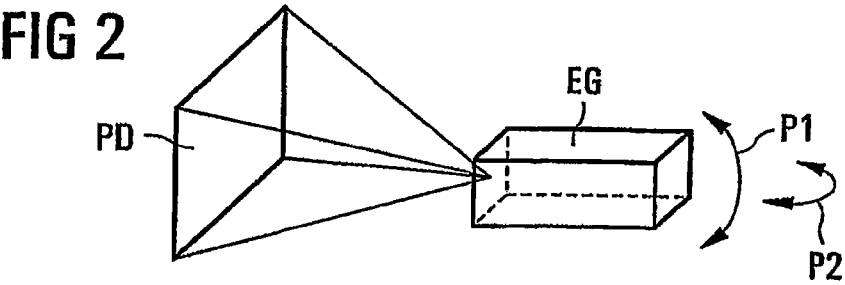
FIG. 2 shows the terminal according to the present invention with a projected display.

The terminal EG according to the present invention shown in FIG. 2 has a projected display PD, an image being projected from the terminal EG via an optical system (OT in FIG. 1), which is not shown in detail, on to a projection surface; for example, a white wall. The reproduction of the image also can be achieved using an appropriately angled base on a table.

The projected display PD is produced by a miniaturized projector or a miniaturized beamer using the optical system in the terminal EG. The design of this projector is of secondary importance to the present invention and is not shown in detail in the drawing.

According to the present invention, the terminal EG has one or more sensors, via which movements and/or juddering of the terminal EG are recorded. These movements are compensated for when the image is reproduced; for example, via a correction of the reproducing optical system (OT in FIG. 1). The movement of the terminal is shown in two planes via symbols; for example, the two bidirectional arrows P1 and P2. The process for stabilizing the image are implemented, for example, by analogy with FIG. 1 and are not shown in detail in FIG. 2.

The terminal EG according to the present invention is, for example, tiltable in two dimensions through a certain angle without the projected image (on the projection surface) or the projected display PD being displaced. This motion compensation is switchably implemented, for example, via a key on the terminal EG. When the motion compensation is switched off, the projected image is adjusted to the selected projection surface, table or wall. Activating the compensation clamps the image, as it were.

Figure 3:
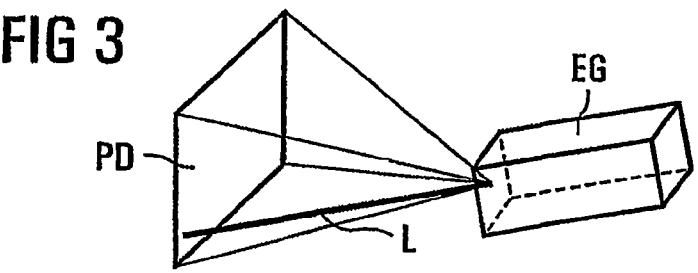
FIG. 3 shows a further embodiment of the terminal, using a light beam as a pointing medium.

In the further embodiment of the present invention shown in FIG. 3, the terminal has a laser pointer. This laser pointer or another light source emits a light beam L which can be positioned through movement of the terminal EG at least within the projected display PD. In this way, for example, details within the projected display PD can be illuminated or highlighted.

Figure 4:
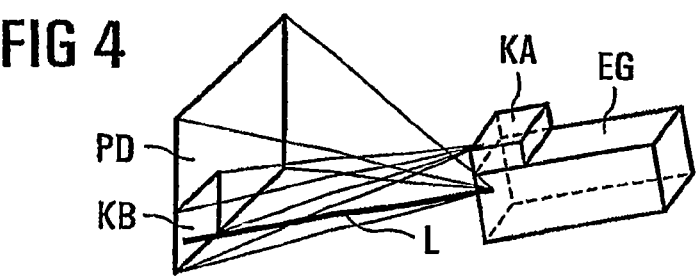
FIG. 4 shows a further embodiment of the terminal according to the present invention, using a camera.

FIG. 4 shows a further embodiment of the present invention in which the terminal EG has a camera KA. The camera KA serves to record the projected image and/or the image content of the projected display PD and also records the position of the light beam L.

This combination can be treated as an operator input for the device EG. A part of the projected display PD is, for example, recorded as a camera image by the camera KA. The camera image KB is, for example, located on the left in the bottom half of the projected display PD.

The combination of projected display PD, light beam L and recording via the camera KA enables operator input without a keyboard. The light beam L is, for example, moved to a symbol in the projected display PD and thereby activates the symbol. The projected display PD according to the present invention does not force the user to switch his/her gaze between a keyboard on the terminal EG and the image shown on or in the projected display PD.

Although the present invention has been described with reference to specific embodiments, those of skill in the art will recognize that changes may be made thereto without departing from the spirit and scope of the present invention as set forth in the hereafter appended claims.

The invention is claimed as follows:

1. A projection apparatus comprising:
   an optical system for generating a projected display, the projected display including a symbol;
   a light beam source for creating a highlighted position in the projected display;
   a camera for capturing at least a portion of the projected display including the highlighted position, wherein the projection apparatus activates the symbol when the highlighted position is moved to the symbol in the projected display thereby acting as an operator input for the projection apparatus; and a sensor that detects physical movement of the projection apparatus;

wherein the projection apparatus determines a position of the projection apparatus resulting from the physical movement and compensates the optical system to stabilize a displacement of the projected display based on the determined position.

2. The projection apparatus of claim 1, wherein the symbol includes a keyboard symbol.

3. The projection apparatus of claim 1, including an integrated keyboard.

4. The projection apparatus of claim 1, wherein the light beam source includes a laser pointer.

5. The projection apparatus of claim 1, wherein compensation of the optical system to stabilize the displacement of the projected display is activated via a switch on the projection apparatus.

6. The projection apparatus of claim 1, wherein the projection apparatus is at least one of a mobile data terminal, a communication terminal, a video telephone and a video camera.

7. A method of receiving an operator input at a projection apparatus, the method comprising:
    generating a projected display through an optical system of the projection apparatus, the projected display including a symbol;
    projecting a light beam source on to the projected display to create a highlighted position in the projected display;
    detecting physical movement of the projection apparatus;
    determining a position of the projection apparatus resulting from the physical movement and compensating the optical system to stabilize a displacement of the projected display based on the determined position;
    capturing at least a portion of the projected display with a camera, the portion including the highlighted position; and
    activating the symbol when the highlighted position is moved to the symbol in the projected display.

8. The method of claim 7, wherein the symbol includes a keyboard symbol.

9. The method of claim 7, wherein the light beam source includes a laser pointer.

10. The method of claim 7, including activating compensation of the optical system via a switch on the projection apparatus.

11. The method of claim 7, wherein the projection apparatus is at least one of a mobile data terminal, a communication terminal, a video telephone and a video camera.

12. A projection apparatus comprising:
    an optical system for generating a projected display;
    a light beam source for creating a highlighted position in the projected display;
    a camera for capturing at least a portion of the projected display including the highlighted position, wherein the projection apparatus activates an operator input when the highlighted position is moved in the projected display; and
    a sensor that detects physical movement of the projection apparatus;
    wherein the projection apparatus determines a position of the projection apparatus resulting from the physical movement and compensates the optical system to stabilize a displacement of the projected display based on the determined position.

13. The projection apparatus of claim 12, wherein the projected display includes a keyboard symbol.

14. The projection apparatus of claim 12, including an integrated keyboard.

15. The projection apparatus of claim 12, wherein the light beam source includes a laser pointer.

16. The projection apparatus of claim 12, wherein compensation of the optical system to stabilize the displacement of the projected display is activated via a switch on the projection apparatus.

17. The projection apparatus of claim 12, wherein the projection apparatus is at least one of a mobile data terminal, a communication terminal, a video telephone and a video camera.

18. The projection apparatus of claim 12, wherein the projection apparatus activates a symbol when the highlighted position is moved to the symbol in the projected display.

19. A method of receiving an operator input at a projection apparatus, the method comprising:
    generating a projected display through an optical system of the projection apparatus;
    projecting a light beam source on to the projected display to create a highlighted position in the projected display;
    detecting physical movement of the projection apparatus;
    determining a position of the projection apparatus resulting from the physical movement and compensating the optical system to stabilize a displacement of the projected display based on the determined position;
    capturing at least a portion of the projected display with a camera, the portion including the highlighted position; and
    activating an operator input when the highlighted position is moved in the projected display.

20. The method of claim 19, wherein the projected display includes a keyboard symbol.

21. The method of claim 19, wherein the light beam source includes a laser pointer.

22. The method of claim 19, including activating compensation of the optical system via a switch on the projection apparatus.

23. The method of claim 19, wherein the projection apparatus is at least one of a mobile data terminal, a communication terminal, a video telephone and a video camera.

24. The method of claim 19, wherein the projection apparatus activates a symbol when the highlighted position is moved to the symbol in the projected display.

* * * * *